(12) United States Patent
Joao

(10) Patent No.: US 9,885,782 B2
(45) Date of Patent: *Feb. 6, 2018

(54) VEHICLE OPERATOR AND/OR OCCUPANT INFORMATION APPARATUS AND METHOD

(75) Inventor: Raymond Anthony Joao, Yonkers, NY (US)

(73) Assignee: GTJ VENTURES, LLC, Yonkers, NY (US)

( * ) Notice: Subject to any disclaimer, the term of this patent is extended or adjusted under 35 U.S.C. 154(b) by 664 days.

This patent is subject to a terminal disclaimer.

(21) Appl. No.: 13/374,915

(22) Filed: Jan. 23, 2012

(65) Prior Publication Data

US 2012/0133770 A1    May 31, 2012

Related U.S. Application Data

(63) Continuation of application No. 09/259,957, filed on Mar. 1, 1999, now Pat. No. 9,075,136.

(60) Provisional application No. 60/076,800, filed on Mar. 4, 1998.

(51) Int. Cl.
*H04N 7/18* (2006.01)
*G01S 11/12* (2006.01)
*G01C 21/36* (2006.01)
*G08G 1/04* (2006.01)
*G08G 1/0967* (2006.01)
*B63B 49/00* (2006.01)

(52) U.S. Cl.
CPC .............. *G01S 11/12* (2013.01); *B63B 49/00* (2013.01); *G01C 21/3691* (2013.01); *G08G 1/04* (2013.01); *G08G 1/096716* (2013.01); *G08G 1/096758* (2013.01); *G08G 1/096783* (2013.01)

(58) Field of Classification Search
CPC ...... G01S 11/12; G06K 9/00791; B63B 45/02
USPC ......................................... 348/113–118, 148
See application file for complete search history.

*Primary Examiner* — Andy Rao
(74) *Attorney, Agent, or Firm* — Raymond A. Joao, Esq.

(57) ABSTRACT

An apparatus and method for providing information to a vehicle operator or occupant, which includes a receiver, for receiving a request for information from a vehicle operator or occupant, a processing device, for processing the request for information, and a transmitter, for transmitting the requested information to the vehicle operator or occupant. The information includes video information regarding one of a traffic condition and a road condition.

25 Claims, 6 Drawing Sheets

VEHICLE OPERATOR AND/OR OCCUPANT INFORMATION APPARATUS AND METHOD

RELATED APPLICATIONS

This application is a continuation application of U.S. patent application Ser. No. 09/259,957, filed Mar. 1, 1999, and entitled "VEHICLE OPERATOR AND/OR OCCUPANT INFORMATION APPARATUS AND METHOD", now U.S. Pat. No. 9,075,136, the subject matter and teachings of which are hereby incorporated by reference herein in their entirety. U.S. patent application Ser. No. 09/259,957, filed Mar. 1, 1999, claims the benefit of the priority of U.S. Provisional Patent Application Ser. No. 60/076,800, filed Mar. 4, 1998, and entitled "VEHICLE OPERATOR AND/OR OCCUPANT INFORMATION APPARATUS AND METHOD", the subject matter and teachings of which are hereby incorporated by reference herein in their entirety.

FIELD OF THE INVENTION

The present invention is directed to a vehicle operator and/or occupant information apparatus for method and, in particular, to a vehicle operator and/or occupant information apparatus and method for providing a vehicle operator and/or occupant with information regarding traffic conditions, road conditions, traffic flow, and other useful information.

BACKGROUND OF THE INVENTION

Each day millions of individuals rely on using their vehicles as the means by which to get from one location to another. As the number of drivers and vehicles on the road increase, so to have traffic and congestion on roads, at bridges, at toll booths, at tunnels, at parking lots and on, or at, other thoroughfares and/or locations.

In today's age, the importance of getting from one location to another can be paramount. As we, as a society, become more productive and move deeper into the information age, it is more and more important for individuals to have an awareness and information pertaining to the locales in which they are driving or traveling, the destinations to which they are headed, as well as the roadways, bridges, toll booths and tunnels which they must travel or use along the way. In today's information age, vehicle operators could greatly benefit from an apparatus and method which could provide a vehicle operator and/or occupant with information regarding the traffic and/or conditions of roadways, highways, brides, toll booths, tunnels, parking lots, etc.

SUMMARY OF THE INVENTION

The present invention provides an apparatus and a method for providing a vehicle operator and/or occupant with information regarding traffic conditions as well as conditions of roadways, highways, bridges, toll booths and tunnels, as well as other roads and/or thoroughfares upon which a vehicle may travel, along with other destinations and/or entities of interest, to a vehicle operator or occupant. In a preferred embodiment, the apparatus and method of the present invention provides video information to a vehicle operator and/or occupant regarding the conditions of roadways, highways, bridges, toll booths and tunnels as well other roads and/or thoroughfares upon which a vehicle may travel, as well as other destinations and/or entities of interest.

In this regard, the present invention provides an apparatus and a method for providing a vehicle operator and/or occupant with information regarding road traffic conditions, traffic on roadways, highways, parkways, expressways, traffic and/or congestion at, or on, bridges, at tunnels and at other locations on a roadway. The present invention can also provide a vehicle operator or occupant with information concerning conditions at toll booths, public areas, public parking lots and other destinations and/or locations.

The present invention provides video information and/or a video image, along with other information, of the conditions of a roadway, a bridge, a tunnel, a toll booth, a parking lot, a public parking lot, such as at shopping malls, at stores, at beaches, and at sports or other entertainment facilities, etc. The video information is provided to the vehicle operator and/or occupant on a display device located in the vehicle. The vehicle operator or occupant may then utilize the information obtained in order to be apprised of traffic and other conditions, during their travels. For example, a driver headed to a destination may utilize the present invention in order to view the traffic conditions on several alternate roadways or at bridges, tunnels or toll booths along the way. The driver may then utilize this information in order to travel the least congested route.

The apparatus comprises a vehicle computer. The vehicle computer which is utilized should provide for convenient use by the vehicle operator and/or occupant. The vehicle computer should at least have its display and user input device located on or in the vehicle dashboard or console. The vehicle computer may be mounted in the vehicle in the same manner as driver information centers and/or navigation computers.

The apparatus also comprises a central processing computer which provides control over the apparatus and which services the vehicle computer. The central processing computer and the vehicle computer communicate with one another over an appropriate or suitable wireless communication network. In the preferred embodiment, the present invention is utilized on and/or over the Internet and/or the World Wide Web and, in particular, a wireless Internet and/or World Wide Web communication network and/or system. In this regard, the present invention, in the preferred embodiment, utilizes wireless Internet and/or World Wide Web services, equipment and/or devices. The central processing computer has a Web Site associated with it. The vehicle computer can access the Web Site of the central processing computer.

Although the Internet and/or the World Wide Web is the preferred communication system and/or medium utilized, it is important to note that the present invention, in all of the embodiments described herein, can be utilized with any appropriate communication systems including, but not limited to network communication systems, telephone communication systems, cellular communication systems, digital communication systems, personal communication systems, personal communication services (PCS) systems, satellite communication systems, broad band communication systems, low earth orbiting (LEO) satellite systems and line telephone systems.

The apparatus further comprises a plurality of video cameras and location computers which are associated with each of the video cameras. The location computers are electronically and/or operatively connected to its respective video camera for providing control over the video camera. Video information, which is recorded by the respective video camera, is provided to the location computer which services the respective video camera. Each location computer has a web site associated therewith.

The central processing computer can access the Web Sites of each of the location computers. The vehicle computer can access the web sites of the location computers via the Web Site associated with the central processing computer on, or over, the Internet and/or the World Wide Web. The vehicle computer can also access the web sites of the location computers directly on, or over, the Internet and/or the World Wide Web. In this manner, the video information recorded by each of the video cameras may be accessed by the vehicle computer and by the central processing computer so that the vehicle operator and/or occupant can obtain the video information at the vehicle computer.

The central processing computer can include a database which contains all of the data and information necessary to provide service to, and perform any of the herein-described functions of, any number of vehicle computers.

The apparatus of the present invention may be utilized in conjunction with any appropriate and/or suitable communication network. In the preferred embodiment, however, the apparatus is utilized in conjunction with the Internet and/or the World wide Web. In this manner, the video camera location video is obtainable by the vehicle operator and/or occupant by accessing either the central processing computer or the selected location computers on, or over, the Internet and/or the World Wide Web by accessing the web sites associated with these respective computers.

Each of the location computers is linked to the central processing computer which services a given region or geographic area. The processing computer, in this manner, can control and obtain information, including video information, from the respective video cameras.

The apparatus also comprises a global positioning device which is located at the vehicle and a database which is also located at the vehicle. The database stores any pre-determined number of locations such as video camera locations on, or near, roadways, highways, expressways, parkways, bridges, toll booths, toll booth plazas, tunnels, shopping mall parking lots, beach parking lots, store parking lots, entertainment and/or sports facilities parking lots and any other location which would be of interest to a vehicle operator and/or occupant.

The names and location data pertaining to the video camera locations, along with the uniform resource locators (URLs) for the respective location computers, and the links therefor, are also stored in the database. The above information can be correlated with vehicle location data which is obtained by the global positioning device. In this manner, the vehicle operator and/or occupant may be advised of those locations which may be of interest to him or her from any location.

After the global positioning device determines vehicle position, the position data may be cross correlated with the location data and other data available in the database so as to provide the vehicle operator and/or occupant with a selection of locations for which he or she may obtain video or other information over the Internet and/or the World Wide Web.

Each of the video cameras, in the preferred embodiment, is stationed and/or located at appropriate viewing locations on, near, or at a location for viewing, roadways, at entrances and exits to roadways, on highways, expressways, on parkways, and at entrances to, and exits from, same, at bridges, at entrances to, and exits from, bridges, at tunnels, in tunnels, at entrances to, and exits from, tunnels, at toll booths, at entrances to toll booth plazas, at parking lots at shopping malls, stores, beaches, sports facilities as well as arenas and entertainment facilities and centers.

Although each of the video cameras may be turned on or off, in the preferred embodiment, the video cameras are in operation 24 hours a day, seven days a week so as to provide continuous surveillance of the roadway, highway, expressway, parkway, bridge, tunnel, toll booth, toll booth plaza, parking lot, or other entity or location, to which it is assigned.

The video cameras, in the preferred embodiment, are stationed on poles, road signs, buildings, overpasses, walls and other appropriate structures adjacent to, near, on, or at a location for viewing, roadways, highways, expressways, along bridges and tunnels, and parking lots. The video cameras can also be stationed along roadways, highways, expressways, highways, along bridges and tunnels, and parking lots, at any desired intervals. For example, a video camera can be stationed at the entrance to, and at the exit ramps, at mile or other distance markers, and on signs on any of the above described roadways, highways, expressways, along bridges and tunnels, in parking lots, and in various locations adjacent to, near, or at a location for viewing, same.

A plurality of vehicle computers may be utilized in conjunction with the present invention so that the present invention can be utilized to provide information to a large number of vehicles and to their operators and/or occupants. The present invention may also comprise a plurality of central processing computers which are typically server computers each of which may be linked with a pre-defined number of location computers assigned to provide service to a pre-defined geographic and/or regional area. In this manner, the present invention may be utilized to provide information and coverage for a very large geographic area. The present invention can be utilized to provide information and coverage internationally.

The present invention, as described above, provides information pertaining to traffic and other conditions on roadways, at entrances and exits to roadways, on highways, expressways, parkways, and at entrances to, and exits from, same, at bridges, at entrances to, and exits from, bridges, at tunnels, in tunnels, at entrances to, and exits from, tunnels, at toll booths, at entrances to toll booth plazas, at parking lots at shopping malls, at stores, at beaches, at sports facilities and at arenas, as well as at entertainment facilities and centers.

A vehicle operator and/or occupant may obtain video information about a selected location simply by accessing either the central processing computer or the location computer which services the video camera at the selected location or locations, at any time. The information which is provided by the present invention can be utilized in assisting a vehicle drive and/or occupant to determine and/or find the most optimal or the least congested route to their destination. For example, a driver headed to a destination may utilize the present invention in order to view the traffic conditions on several alternate roadways, bridges, tunnels or toll booths along the way. The driver may then utilize this information in order to travel the least congested route.

In an alternate embodiment, the present invention may be utilized to provide all of the information described above regarding locations to a user over a home or a personal computer, including a laptop computer, a handheld computer, a palmtop computer, a television, an interactive television, a digital television, a personal digital assistant, a telephone, a digital telephone, a personal communication device, and a personal communications services device. In this manner, information about any of the herein-described locations can be available to a user at, or from, any location.

The present invention describes an apparatus and a method for providing the above-described information about the above-described locations so as the provide a vehicle operator and/or occupant with valuable information concerning the roadways, bridges, tunnels, toll booths and/or parking lots which would enable the vehicle operator and/or occupant to make informed driving and/or traveling decisions. For example, a vehicle operator traveling to a given destination, may wish to view various locations along the way to his or her destination. By utilizing the apparatus and method of the present invention, the vehicle operator may view roadways, bridges, tunnels, toll booths, along the way, so as to select the route with the least traffic, congestion of traffic delays.

Further, the apparatus and method of the present invention provides an embodiment for allowing a user of a home or personal computer to obtain the same information from his or her home or other location so as to more carefully plan out his or her trip beforehand.

The present invention can provide an apparatus and a method for providing hands-free use by a vehicle operator or driver.

In any of the preferred embodiments described herein, vehicle location data may be entered and/or updated manually by the vehicle operator or occupant such as by selecting location or position information from a menu selection. The apparatus and method of the present invention can ascertain a travel route and provide information pertaining to different locations or points along the travel route.

The apparatus and method of the present invention can provide video and other information about a travel route or location or point along, or on, a travel route, in real-time. The present invention also provides and apparatus and a method to allow an individual to preview a planned or anticipated travel route from any location or place.

The present invention provides real-time traffic conditions, road conditions and weather conditions and provides valuable information to any traveler.

Accordingly, it is an object of the present invention to provide an apparatus and a method for providing a vehicle operator and/or occupant with information.

It is another object of the present invention to provide an apparatus and a method for providing a vehicle operator and/or occupant with information regarding traffic conditions, road conditions, traffic flow, or other useful information.

It is another object of the present invention to provide an apparatus and a method for providing a vehicle operator and/or occupant with information regarding conditions of roadways, highways, bridges, toll booths and tunnels, as well as other roads, thoroughfares, or destinations and/or other entities of interest.

It is still another object of the present invention to provide an apparatus and a method for providing a vehicle operator and/or occupant with video information and/or a video images, along with other travel-related information.

It is yet another object of the present invention to provide an apparatus and a method for providing a vehicle operator and/or occupant with information which is utilized on, or over, a communication network.

It is another object of the present invention to provide an apparatus and a method for providing a vehicle operator and/or occupant with information which is utilized on, or over, the Internet and/or the World Wide Web.

It is yet another object of the present invention to provide an apparatus and a method for providing a vehicle operator and/or occupant with information from any location.

It is still another object of the present invention to provide an apparatus and a method for providing a vehicle operator and/or occupant with information which provides for hands-free operation.

It is still another object of the present invention to provide an apparatus and a method for providing a vehicle operator and/or occupant with information which also provides for manual, as well as automatic, entry of vehicle location data or information.

It is yet another object of the present invention to provide an apparatus and a method for providing a vehicle operator and/or occupant with information pertaining to different locations or points along a travel route.

It is another object of the present invention to provide an apparatus and a method for providing a vehicle operator and/or occupant with information which determines a travel route and provides information pertaining to different locations or points along the travel route.

It is still another object of the present invention to provide an apparatus and a method for providing a vehicle operator and/or occupant with information about a travel route or location or point along, or on, a travel route.

It is yet another object of the present invention to provide an apparatus and a method for providing a vehicle operator and/or occupant with a preview of a planned or anticipated travel route.

It is yet another object of the present invention to provide an apparatus and a method for providing a vehicle operator and/or occupant with travel-related information in real-time.

Other objects and advantages of the present invention will be apparent to those skilled in the art upon a review of the Description of the Preferred Embodiment taken in conjunction with the Drawings which follow.

DESCRIPTION OF THE PREFERRED EMBODIMENTS

The present invention provides an apparatus and a method for providing a vehicle operator and/or occupant with information regarding traffic conditions as well as conditions of roadways, highways, bridges, toll booths and tunnels, as well as other roads and/or thoroughfares upon which a vehicle may travel, along with other destinations and/or entities of interest, to a vehicle operator or occupant. In a preferred embodiment, the apparatus and method of the present invention provides video information to a vehicle operator and/or occupant regarding the conditions of roadways, highways, bridges, toll booths and tunnels as well as other roads and/or thoroughfares upon which a vehicle may travel, as well as other destinations and/or entities of interest.

In this regard, the present invention provides an apparatus and a method for providing a vehicle operator and/or occupant with information regarding road traffic conditions, traffic on roadways, highways, parkways, expressways, traffic and/or congestion at, or on, bridges, at tunnels and at other locations on a roadway. The present invention can also provide a vehicle operator or occupant with information concerning conditions at toll booths, public areas, public parking lots and other destinations and/or locations.

The present invention provides video information and/or a video image, along with other information, of the conditions of a roadway, a bridge, a tunnel, a toll booth, a parking lot, a public parking lot, such as at shopping malls, at stores, at beaches, and at sports or other entertainment facilities, etc. The video information is provided to the vehicle operator and/or occupant on a display device located in the vehicle. The vehicle operator or occupant may then utilize the information obtained in order to be apprised of traffic and other conditions, during their travels. For example, a driver headed to a destination may utilize the present invention in order to view the traffic conditions on several alternate roadways or at bridges, tunnels or toll booths along the way. The driver may then utilize this information in order to travel the least congested route or to make other travel related decisions based upon the information obtained.

Figure 1:
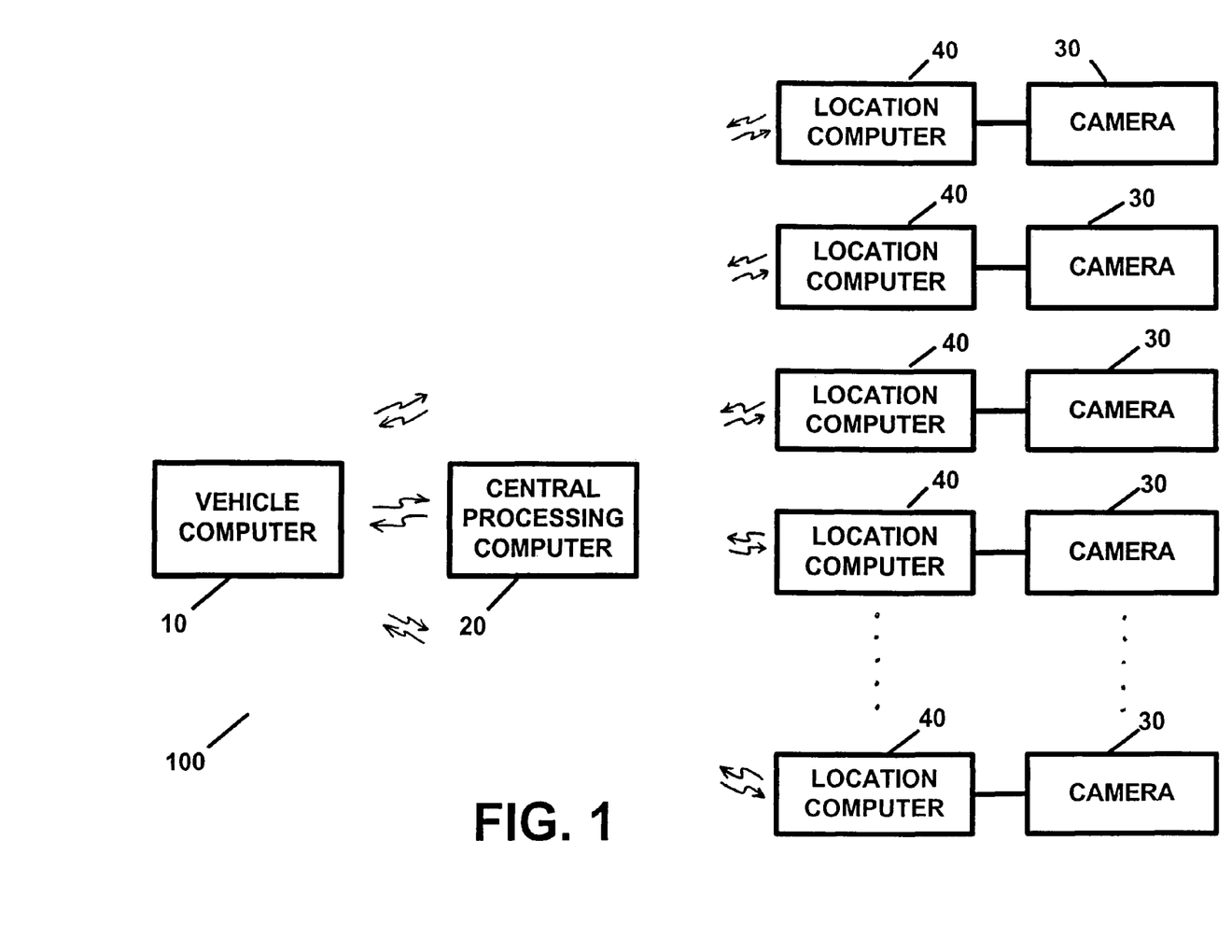
FIG. 1 illustrates the apparatus of the present invention, in block diagram form.

Applicant hereby incorporates by reference herein the subject matter of U.S. Provisional Patent Application Ser. No. 60/076,800. FIG. 1 illustrates a preferred embodiment of the apparatus of the present invention which is designated generally by the reference numeral 100. In FIG. 1, the apparatus 100 includes a vehicle computer 10. The vehicle computer 10, in the preferred embodiment, is a personal computer. Although any type of personal computer and/or laptop computer may be utilized, in the preferred embodiment, the vehicle computer 10 can be an integral part of the vehicle so that it will provide for convenient use by the vehicle operator and/or occupant.

In the preferred embodiment, the vehicle computer 10 should at least have its display and user input device located on, in, or adjacent to, the vehicle dashboard or console. In this manner, the vehicle computer 10 may be mounted in the vehicle in the same manner that driver information centers and/or navigation computers are mounted therein.

The apparatus 100 also includes a central processing computer 20 which provides control over the apparatus 100 and which services the vehicle computer 10. In the preferred embodiment, any number of central processing computers 20 may be utilized in order to provide the servicing functions described herein. The apparatus 100 may contain any number of central processing computer 20. In such an embodiment, a given central processing computer 20 may service a particular geographic area.

The central processing computer(s) 20 and the vehicle computer 10 communicate with one another over a wireless communication network. In the preferred embodiment, the present invention is utilized on, and/or over, the Internet and/or the World Wide Web and, in particular, a wireless Internet and/or World Wide Web communication network and/or system. In this regard, the present invention, in the preferred embodiment, utilizes wireless Internet and/or World Wide Web services, equipment and/or devices. The central processing computer(s) 20, in the preferred embodiment, have a web site or web sites associated therewith.

Although the Internet and/or the World Wide Web is the preferred communication system and/or medium utilized, the present invention, in all of the embodiments described herein, can be utilized with any appropriate communication systems including, but not limited to, network communication systems, telephone communication systems, cellular communication systems, digital communication systems, personal communication systems, personal communication services (PCS) systems, satellite communication systems, broad band communication systems, low earth orbiting (LEO) satellite systems and line telephone systems.

The apparatus 100 also includes a plurality of video cameras 30. Each of the video cameras 30, in the preferred embodiment, has associated therewith a location computer 40. The location computers 40 are electrically and/or operatively connected to its respective video camera 30 for providing control over the respective video camera 30. In the preferred embodiment, each location computer 40 has a web site associated therewith. Any number of location computers 40 may be accessed by one or more of the central processing computers. The vehicle computer 10 and the central processing computer(s) 20 can access the web sites of each of the location computers 40.

The vehicle computer 10 can access the web sites of the location computers 40 via the web site(s) associated with the central processing computer(s) 20, over the Internet and/or the World Wide Web. The vehicle computer 10 can also access the web sites of the location computers 40 directly over the Internet and/or the World Wide Web. The video information which is recorded by the video camera 30 may be accessed by the vehicle computer 10 and/or by the central processing computer(s) 20 so that the vehicle operator and/or occupant can obtain the video information at the vehicle computer 10.

In cases where the apparatus 100 is used with other communication systems, the vehicle computer 10, the central processing computer(s) 20, and the location computers, can be equipped with appropriate transmitters and receivers and/or other communication equipment or peripherals.

The video from each of the video cameras 30 is available at the web site of its associated location computer 40. The video from the each of the video cameras 30 is then available to the vehicle computer 10 via the central processing computer(s) 20. The video from each of the video cameras 30 is also available to the vehicle computer 10 via each of the web sites of the respective location computers 40. In the preferred embodiment, the location computers 40 also communicate with the central processing computer(s) 20 on, or over, the Internet and/or the Wide Web.

Each of the location computers 40 is linked to the central processing computer(s) 20. The central processing computer(s) 20, in this manner, can control and obtain information, including video information, from the respective video cameras 30. In the preferred embodiment, the uniform resource locator (URL) for each of the location computers 40 is provided at the central processing computer(s) 20. In the above manner, each video camera 30 which is utilized with the apparatus 100 of the present invention, can be associated with a uniform resource locator which is an assigned address distinct to the respective location computer 40 and video camera 30.

Any of the central processing computers 20, in the preferred embodiment, can be a server computer which supports a web site which provides the links to a plurality of the location computers 40 which are utilized in conjunction with the apparatus 100. The location computers 40, in the preferred embodiment, are also server computers which can be accessed by the vehicle operator or occupant via the central processing computer(s) 20 and/or the web site associated therewith. Each of the location computers 40, can provide control over the video camera 30 associated therewith. The operation of any one of the location computers 40 can be controlled via the central processing computer(s) 20.

The vehicle operator and/or occupant can directly access each of the location computers 40 via the vehicle computer 10. In this regard, the vehicle operator and/or occupant may simply access a location computer 40 via its uniform resource locator, or link, which can be provided to, and at, the vehicle computer 10.

Figure 2:
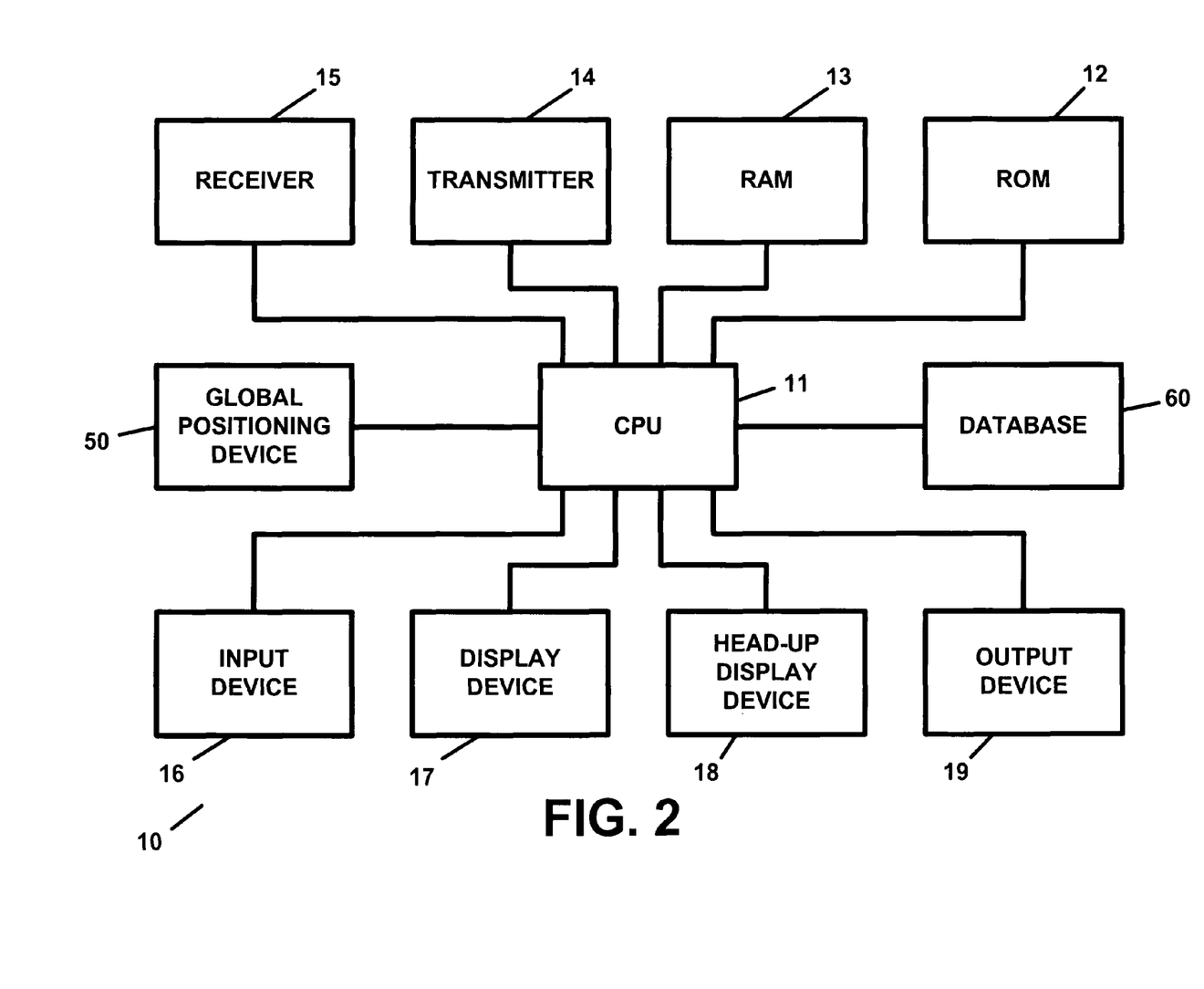
FIG. 2 illustrates the vehicle computer of FIG. 1, in block diagram form.

FIG. 2 illustrates the vehicle computer 10 of FIG. 1, in block diagram form. In FIG. 2, the vehicle computer 10 includes a central processing unit (CPU) 11 which controls the processing of the vehicle computer 10. The vehicle computer 10 also includes a read only memory (ROM) 12, which is electrically connected to the CPU 11. The vehicle computer 10 also includes a random access memory (RAM) 13, which is electrically connected to the CPU 11.

The vehicle computer 10 also includes a transmitter 14 for transmitting signals to the central processing computer(s) 20 or transmitting signals to any of the location computers 40 which are utilized with the apparatus 100. The vehicle computer 10 also includes a receiver 15 for receiving signals from the central processing computer(s) 20 or for receiving signals from any of the location computers which are utilized in conjunction with the apparatus 100.

The vehicle computers 10, as well as the central processing computers 20, and the location computers 40, which are utilized in the apparatus 100 of the present invention, include the necessary equipment and/or peripherals to operate on, or over, the Internet and/or the World Wide Web. The vehicle computer 10 also includes an user input device 16 for facilitating user input of commands and data into the vehicle computer 10. The user can thereby utilize the user input device 16 to exercise control over, and operate, the vehicle computer 10.

The user input device 16 is also electrically connected to the CPU 11. In the preferred embodiment, the user input device 16 includes a keypad and a pointing device. The pointing device, in the preferred embodiment, is a mouse, a mouse-like device, a roll ball, a touch pad, a combination of the above devices, or any other known computer pointing device. In the preferred embodiment, the user input device 16 includes a keypad and a mouse-like pointing device.

The vehicle computer 10 also includes a display device 17 which is also electrically connected to the CUP 11. The display device 17 provides a video or visual display of information to the vehicle operator and/or occupant. The display device 17, in the preferred embodiment, is mounted on, or adjacent to, the vehicle dashboard or console, at a location for easy viewing and operation by the operator and/or occupant. The display device 17 also provides the apparatus 100 with a graphical user interface (GUI) capabilities.

The vehicle computer 10 also includes a head up display device 18 for providing information to the vehicle operator on the windshield so that the operator may view the information without having to remove his or her eyes from the road. The vehicle computer 10 also includes an output device 19 which is also electrically connected to the CPU 11. The output device 19 can be any suitable output device for providing information to the vehicle operator or occupant. In the preferred embodiment, the output device 19 is a printer.

Each of the central processing computers 20, and the location computers 40, will have web sites and URLs associated therewith so that all of the above computers are accessible over the Internet and/or the World Wide Web.

The vehicle computer 10, in the preferred embodiment, also includes a global positioning device 50 for determining the position and/or location of the vehicle. The vehicle computer 10 also includes a database 60 for storing the names, locations, addresses, and URLs, for any predefined group and/or for all of the central processing computers 20 and the location computers 40 which are utilized in conjunction with the present invention. The database 60 also stores information concerning the locations of various roadways or highways, at points on, near, or adjacent to these roadways or highways, at entrances and exits to these roadways or highways, including expressways, or parkways, and at entrances to, and exits from, same, at bridges, at entrances to, and exits from, bridges, at tunnels, in tunnels, at entrances to, and exits from, tunnels, at toll booths, at entrances to toll booth plazas, at parking lots at shopping malls, stores, beaches, sports facilities and arenas and entertainment facilities and centers, which are monitored and/or covered by the apparatus 100.

The database 60 also contains the locations for any number of locations, such as video camera locations, on roadways, highways, expressways, parkways, bridges, toll booths, toll booth plazas, tunnels, shopping mall parking lots, beach parking lots, store parking lots, entertainment and/or sports facilities parking lots, and any other location which would be of interest to a vehicle operator and/or occupant.

The database 60 also contains location data or information, which includes the latitude and longitude for any of the locations along roadways, highways, expressways, parkways, and/or exits, overpasses or other points of interest along same, bridges, tunnels, toll booths or toll booth plazas, or destinations of interest, etc.

The database 60 also contains travel route data or information between locations and/or between locations and destinations. Locations data or information for cameras along a given route or given routes can be linked utilizing database management techniques in or to provide data or information along or for a given travel route. The database 60 also contains location data and information for any of the various cameras 30.

In any of the embodiments described herein, any location data or information may include latitude and longitude data or information and/or any other suitable data or information for identifying a given location.

In any of the embodiments described herein, the data and/or information stored in the database 60 may be obtained via data or information which is pre-stored in same, data or information which is loaded into the vehicle computer 10 from a storage medium such as a floppy disk, a diskette, a compact disk, or a digital video disk, or via any other storage medium, or data or information which is downloaded from any of the central processing computers 20 which are utilized in conjunction with the present invention. The vehicle computer 10, in order to accommodate data and information loading may include a respective floppy disk drive, diskette drive, compact disk drive, or digital video disk drive.

The database 60 can be updated by updates obtained from any of the central processing computers 20 and/or the location computers 40 which are utilized with the present invention. The updates can be obtained on, or over, the Internet and/or the World Wide Web.

The names and location data pertaining to the video camera locations, along with the URLs for the respective location computers 40, along with links thereto or therefor, including hyperlinks, are also stored in the database 60. The above information can be correlated with vehicle location data which is obtained by the global positioning device 50. In this manner, the vehicle operator and/or occupant may be advised of those locations which may be of interest to him or her from any location. After the global positioning device 50 determines vehicle position, the position data may be cross correlated with the location data and other data available in the database 60 so as to provide the vehicle operator and/or occupant with a selection of locations which he or she may obtain video or other information.

The vehicle computer 10 may also be programmable so that the vehicle operator or occupant can enter vehicle position data and destination data into the vehicle computer 10. The vehicle computer 10 can be programmed so that, the driver or occupant can obtain video information and updates pertaining thereto for locations up ahead in their travels. The vehicle operator or occupant can also, request and receive video information and updates for alternate routes up ahead in their travels.

Vehicle position data may be obtained via the global positioning device 50. Vehicle position data may also be entered manually by the vehicle operator or occupant.

The present invention, as described above, provides information pertaining to traffic and other conditions on roadways, highways, expressways, or parkways, at entrances and exits to roadways, highways, expressways, or parkways, and at entrances to, and exits from, same, at bridges, at entrances to, and exits from, bridges, at tunnels, in tunnels, at entrances to, and exits from, tunnels, at toll booths, at entrances to toll booth plazas, at parking lots at shopping malls, at stores, at beaches, at sports facilities and arenas and at entertainment facilities and centers, which are monitored by the apparatus 100.

In another preferred embodiment, the display device 17, which is utilized, is provided with a screen for viewing a plurality of video images at the same time so that the vehicle operator or occupant may request and/pr receive from, or about, a plurality of locations. In this manner, the vehicle operator or occupant can obtain, for simultaneous viewing, a plurality of video images and/or other information for a plurality of locations. For example, a vehicle operator traveling to a location accessible by a plurality of bridges may receive video of the toll booth plazas for each bridge.

In the preferred embodiment, the database 60 stores, the uniform resource locators (URLs) for any number of location computers 40 which are associated with the various locations of the video cameras 30. The location information stored in the database may be downloaded from the central processing computer(s) 20 which service the respective region. In this manner, the database 60 may be updated by the central processing computer for a given region each time it enters a new region. The database 60 may also contain location information which can be loaded into the vehicle computer by the vehicle operator or occupant. The database 65 also store information concerning travel routes between locations or destinations.

Figure 3:
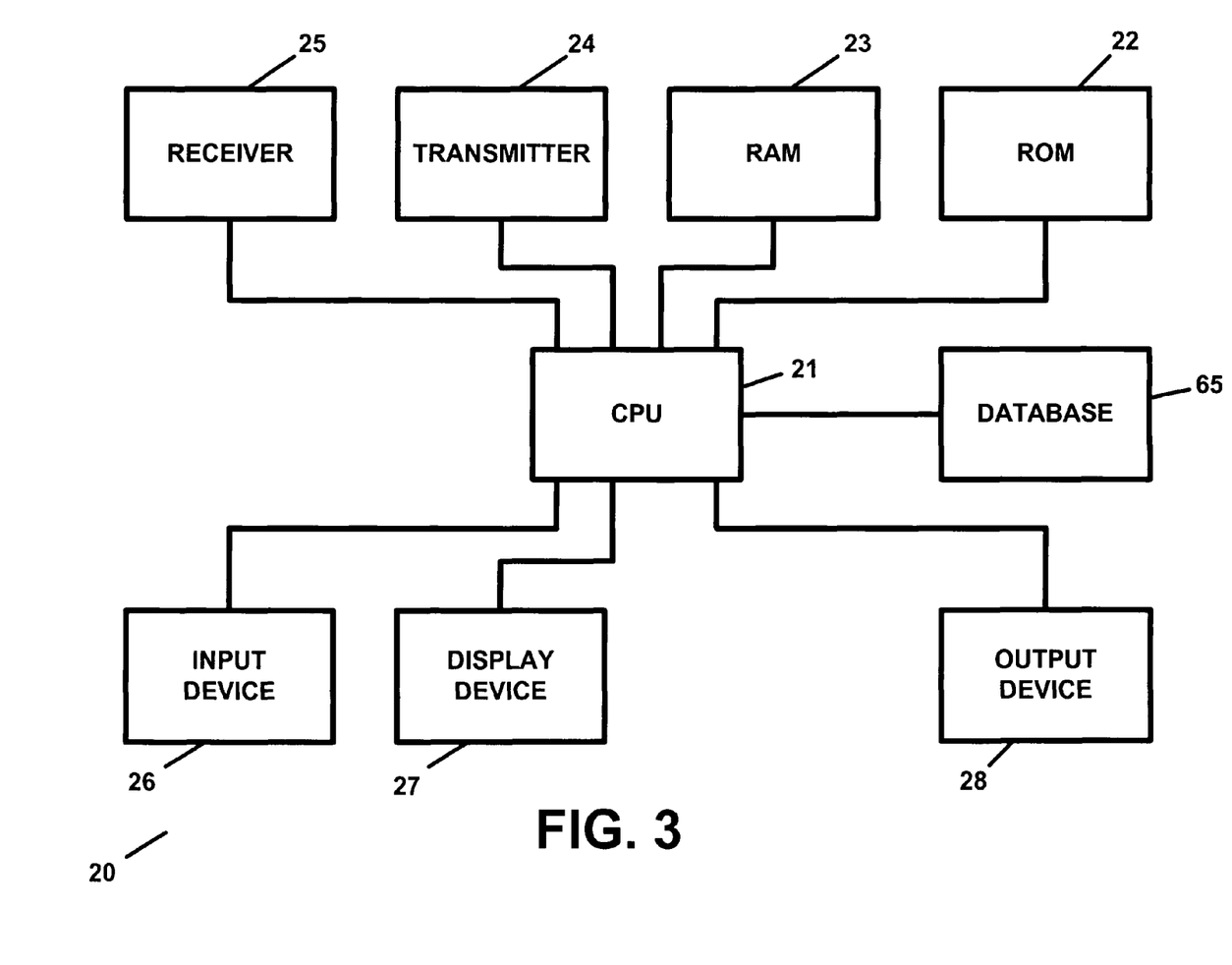
FIG. 3 illustrates the central processing computer of FIG. 1, in block diagram form.

FIG. 3 illustrates the central processing computer 20 of FIG. 1, in block diagram form. In FIG. 3, the central processing computer 20 includes a central processing unit (CPU) 21 which controls the processing of the central processing computer 20. The central processing computer 20 also includes a read only memory (ROM) 22, which is electrically connected to the CPU 21. The central processing computer 20 also includes a random access memory (RAM) 23, which is electrically connected to the CPU 21.

The central processing computer 20 also includes a transmitter 24 for transmitting signals to the vehicle computers 10 and for transmitting signals to the location computers 40 which are utilized with the apparatus 100. The central processing computer 20 also includes a receiver 25 for receiving signals from the vehicle computers 10 or for receiving signals from the location computers 40 which are utilized in conjunction with the apparatus 100 of the present invention.

The central processing computers 20, as well as the vehicle computers 10 and the location computers 40, which are utilized with the apparatus 100 of the present invention, include the necessary equipment and/or peripherals needed to operate on, or over, the Internet and/or the World Wide Web. The central processing computer 20 also includes an user input device 26 for facilitating user input of commands and data into the central processing computer 20. The user can thereby utilize the user input device 26 to exercise control over, and operate, the central processing computer 20.

The user input device 26 is also electrically connected to the CPU 21. In the preferred embodiment, the user input device 26 includes a keypad and a pointing device. The pointing device, in the preferred embodiment, is a mouse, a mouse-like device, a roll ball, a touch pad, a combination of the above devices, or any other known computer pointing device. In the preferred embodiment, the user input device 26 includes a keypad and a mouse-like pointing device.

The central processing computer 20 also includes a display device 27 which is also electrically connected to the CPU 21. The display device 27 provides a video or visual display of information to the user or operator of the central processing computer 20. The display device 27 also provides the apparatus 100 with a graphical user interface (GUI) capabilities.

The central processing computer 20 also includes an output device 28 which is also electrically connected to the CPU 21. The output device 28 can be any suitable output device for proving information to the user or operator of the central processing computer. In the preferred embodiment, the output device 28 is a printer.

Each of the central processing computers 20 and the location computers 40 will have web sites and URLs associated therewith so that all of the above computers are accessible over the Internet and/or the World Wide Web.

The central processing computer 20 also includes a database 65 for, storing the names, locations, addresses, and URLs for any predefined group and/or all of the central processing computers 20 and the location computers 40 which are utilized with the present invention. The database 65 also stores data and/or information concerning the vehicle operators, occupants, and vehicles, which utilize or subscribe to, or which are utilized with, respectively, the services which are provided by the apparatus and method of the present invention.

The database 65 also stores information about the various roadways, at entrances and exits to roadways, on highways, expressways, or parkways, and at entrances to, and exits from, same, at bridges, at entrances to, and exits from, bridges, at tunnels, in tunnels, at entrances to, and exits from, tunnels, at toll booths, at entrances to toll booth plazas, at parking lots at shopping malls, stores, beaches, sports facilities and arenas and entertainment facilities and centers, which are monitored and/or covered by the apparatus 100. The database 65 also store information concerning travel routes between locations or destinations.

The database 65 stores any pre-determined number of locations such as video camera locations on roadways, highways, expressways, parkways, bridges, toll booths, toll booth plazas, tunnels, shopping mall parking lots, beach parking lots, store parking lots, entertainment and/or sports facilities parking lots, and any other location which would be of interest to a vehicle operator and/or occupant. The database 65 can be updated by updates obtained from any of the central processing computers 20, from a main central processing computer (not shown), or from any of the location computers 40 which are utilized with the present invention. The updates can be obtained on, or over, the Internet and/or the World Wide Web.

The names and location data pertaining to the video camera locations, along with the URLs for the respective location computers 40, along with links therefor, are also stored in the database 65. The above information can be correlated with vehicle location data which is obtained by the global positioning device 50 of the respective vehicle computer 10 which global positioning data can be transmitted to the central processing computer 20. The central processing computer 20 may transmit data and/or information concerning the locations of cameras 40 to any of the vehicle computers 10. In this manner, a vehicle operator and/or occupant may be advised of camera locations in there vicinity, in or along their travel route, or of other interest to the vehicle operator or occupant.

If the global positioning device 50 determines vehicle position, or if vehicle position information is manually entered by the vehicle operator or occupant, the position information can be transmitted to the central processing computer and correlated with the data and/or information stored in the database 65 so as to provide the vehicle operator and/or occupant with a selection of locations which he or she may access to obtain video or other information.

As noted herein, the present invention, as described above, provides information pertaining to traffic and other conditions on roadways, at entrances and exits to roadways, on highways, expressways, or parkways, and at entrances to, and exits from, same, at bridges, at entrances to, and exits from, bridges, at tunnels, in tunnels, at entrances to, and exits from, tunnels, at toll booths, at entrances to toll booth plazas, at parking lots at shopping malls, at stores, at beaches, at sports facilities and arenas and at entertainment facilities and centers.

In the preferred embodiment, the database 65 stores, the uniform resource locators (URLs) for any number of location computers 40 which are associated with the various locations of the video cameras 30. The URL data for each camera may be cross referenced with geographical data of each video camera 30 so that the position and/or location data obtained by the global positioning device 50 can be utilized so as to identify all of the locations and URLs for the associated location computers 40 in the vehicle's region or area of travel.

The URL information is continuously updated and is available at the central processing computers 20 and/or the vehicle computer 10 so that the vehicle operator and/or occupant may have access to the respective locations as the vehicle travels. URL updates from the central processing computers 20 and from the location computers 40 can also be obtained by the vehicle computer 10. In this manner, the present invention provides continuous location information to a vehicle operator or occupant, which information can be utilized to obtain information regarding a location or a group of locations.

The database 65 also contains location data or information, which includes the latitude and longitude for any of the locations along roadways, highways, expressways, parkways, and/or exits, overpasses or other points of interest along same, bridges, tunnels, toll booths or toll booth plazas, or destinations of interest, etc.

The database 65 also contains travel route data or information between locations and/or between locations and destinations. Locations data or information for cameras along a given route or given routes can be linked utilizing database management techniques in or to provide data or information along or for a given travel route. The database 65 also contains location data and information for any of the various cameras 30.

In any of the embodiments described herein, any location data or information may include latitude and longitude data or information and/or any other suitable data or information for identifying a given location.

In any of the embodiments described herein, the data and/or information stored in the database 65 may be obtained via data or information which is pre-stored in same, data or information which is loaded into the central processing computer 20 from a storage medium such as a floppy disk, a diskette, a compact disk, or a digital video disk, or via any other storage medium, or data or information which is downloaded from any other central processing computer(s) 20 which are utilized in conjunction with the present invention. The central processing computer 20, in order to accommodate data and information loading may include a respective floppy disk drive, diskette drive, compact disk drive, or digital video disk drive.

The database 65 can be updated by updates obtained from any of the central processing computers 20 and/or the location computers 40 which are utilized with the present invention. The updates can be obtained on, or over, the Internet and/or the World Wide Web.

Although the Internet and/or the World Wide Web is the preferred communication system and/or medium utilized, it is important to note that communication between any one of the location computers 40, the central processing computers 20, and the vehicle computers 10, can be provided over any suitable communication system including, but not limited to network communication systems, telephone, communication systems, cellular communication systems, digital communication systems, personal communication systems, personal communication services (PCS) systems, satellite communication systems, broad band communication systems, low earth orbiting (LEO) satellite systems and line telephone systems.

Each of the video cameras 30, in the preferred embodiment of the invention, are designed for use outdoors so that they will be unaffected by the environment and/or the elements. A manual and/or an automatic lenses clearing and/or cleaning device is employed, in the preferred embodiment, so as to maintain the lenses of the video cameras 30, and so as to ensure that they are cleaned for continuous use.

Each of the video cameras 30, in the preferred embodiment, have wide angle lenses for maximum viewing capabilities. The video cameras 30, depending upon its desired usage, may be moveable, rotatable and/or pivotable. Movement, rotation, and/or pivoting, of the video cameras 30 may be controlled by the central processing computer(s) 20, or by the location computer 30, corresponding thereto.

Each of the video cameras 30, in the preferred embodiment, is stationed and/or located at, on, near, or at locations for viewing, roadways, entrances and exits to roadways, highways, expressways, or parkways, and entrances to, and exits from, same, bridges, entrances to, and exits from, bridges, tunnels, inside tunnels, entrances to, and exits from, tunnels, toll booths, entrances to toll booth plazas, parking lots, shopping malls, stores, beaches, sports facilities and arenas and entertainment facilities and centers. Although each of the video cameras 30 may be turned on or off, in the preferred embodiment, the video cameras 30 are in operation 24 hours a day, seven days a week so as to provide continuous surveillance of the locations to which they are assigned.

The video cameras 30, in the preferred embodiment, are stationed on poles, road signs, buildings, overpasses, walls and other appropriate structures adjacent to, on, or at a location for viewing, roadways, highways, expressways, bridges and tunnels, and parking lots. The video cameras 30 can also be stationed along roadways, highways, expressways, along bridges and tunnels, and parking lots, at any desired intervals. For example, a video camera 30 can be stationed at a location for viewing the entrance and/or exit ramps, at mile or other distance markers and on signs, on or near any of the above described roadways, highways, expressways, bridges, tunnels, along roadways, bridges and tunnels, parking lots, and in various locations adjacent to, near, or at a location for viewing, same.

In the preferred embodiment, a plurality of vehicle computers 10 may be utilized in conjunction with the present invention so that the present invention can be utilized to provide information to a large number of vehicles and to their operators and/or occupants.

The present invention, in the preferred embodiment, also includes a plurality of central processing computers 20 which, in the preferred embodiment, are server computers each of which may be linked with a pre-defined number of location computers 40 and associated video cameras 30, which are assigned to provide service to a pre-defined geographic and/or regional area. In this manner, the present invention may be utilized to provide information and coverage to a very large geographic area. In the preferred embodiment, the present invention can be utilized to provide information and coverage internationally.

As noted above, the present invention is utilized on or over the Internet and/or the World Wide Web. In this regard, the present invention utilizes TCP/IP protocol. Applicant hereby incorporates by reference herein those known systems, devices and techniques for providing live and/or recorded information over a communication network and, in particular, on, or over, the Internet and/or the World Wide Web.

The present invention, as described above, provides information pertaining to traffic and other conditions on roadways, at entrances and exits to roadways, on highways, expressways, or parkways, and at entrances to, and exits from, same, at bridges, at entrances to, and exits from, bridges, at tunnels, in tunnels, at entrances to, and exits from, tunnels, at toll booths, at entrances to toll booth plazas, at parking lots at shopping malls, at stores, at beaches, at sports facilities and arenas and at entertainment facilities and centers.

Figure 4:
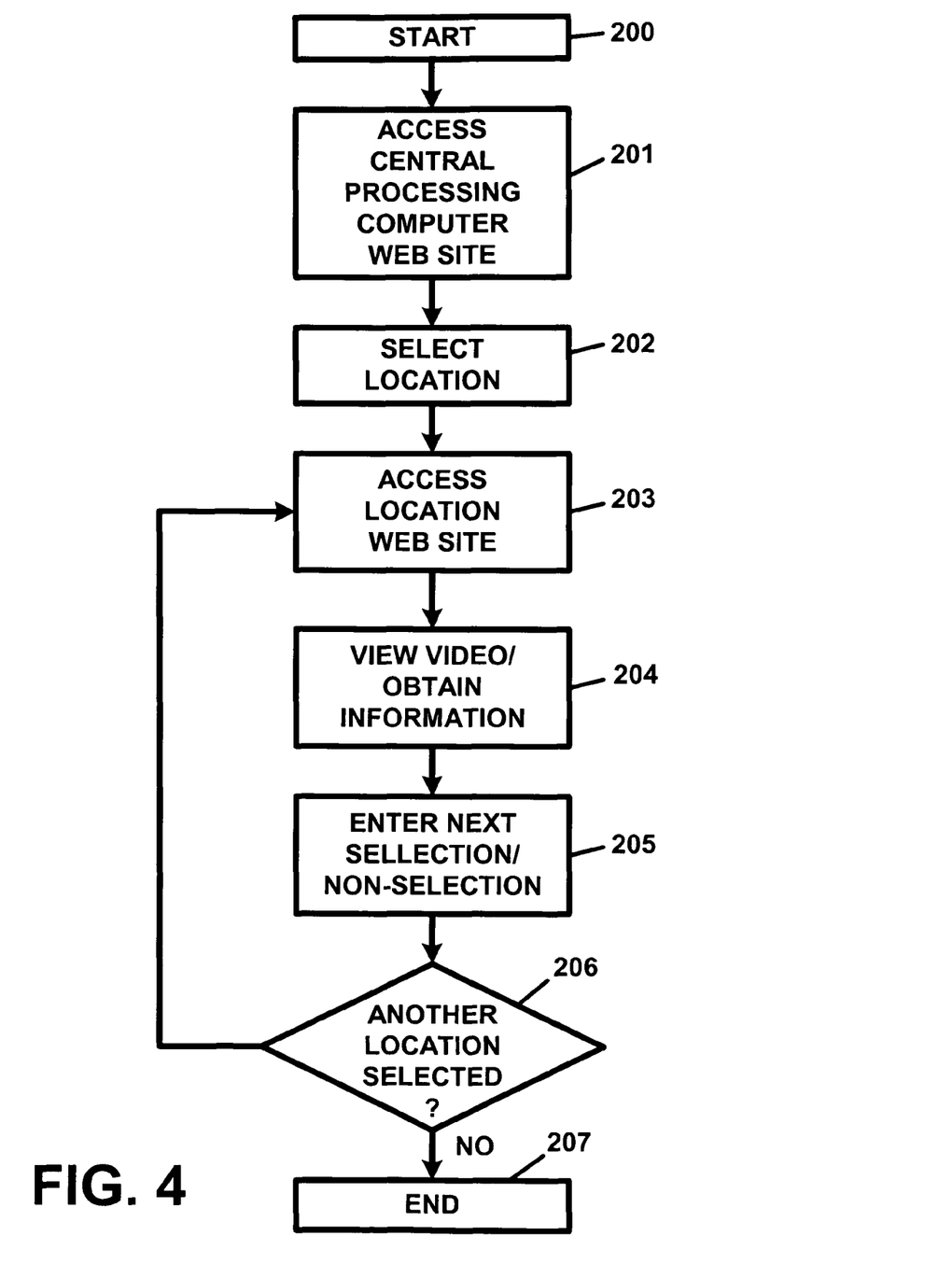
FIG. 4 illustrates a flow chart diagram of the operation of the apparatus of FIG. 1.

FIG. 4 illustrates a flow diagram of the operation of the apparatus 100 and method of the present invention. The apparatus 100, in the preferred embodiment, is utilized in the following manner. With reference to FIG. 4, the operation of the apparatus 100 commences, at step 200, upon activation by the vehicle operator and/or occupant. At step 201, the vehicle operator or occupant will access the web site associated with the central processing computer(s) 20 which service the region in which information is requested. The vehicle operator or occupant may also simply access the central processing computer(s) 20 in an embodiment in which no web site is utilized. The vehicle operator or occupant accesses the central processing computer(s) 20, or the web site associated with same, via the vehicle computer 10.

The vehicle operator or occupant may access the central processing computer 20 and/or the associated web site directly or, if the central processing computer or the web site associated therewith is not known, the vehicle operator or occupant may utilize vehicle location data obtained from the global positioning device 50 and the data stored in the database 60 in order to identify the central processing computer 20 and/or its associated web site. The position data may be cross correlated with the data stored in the database 60 in order to identify the appropriate central processing computer 20, the web site associated therewith, the appropriate location computers 40 in the region, and the web sites associated therewith.

At step 202, the vehicle operator or occupant then selects the location of the selected roadway, highway, expressway, parkway, bridge, tunnel, toll booth, toll booth plaza, parking lot, shopping mall, store, beach, sports facility or arena, or entertainment facility or center (hereinafter referred to as "location"), which the vehicle operator or occupant wants to obtain video and/or other information about. The vehicle operator or occupant selects the location by entering information via the input device 16. At step 202, the operator or occupant will select the location by selecting the uniform resource locator (URL) for the web site of the location computer 40 associated with the selected location.

At step 203, the vehicle computer 10 will access the web site of the location computer 40 for the selected location. At step 204, the vehicle operator or occupant can view the video information pertaining to the selected location via the web site of the selected location computer 40. The video information, as well as other information, is obtained via the display device 17 of the vehicle computer 10. Audio information can also be obtained from an audio device (not shown) which is also a component of the vehicle computer 10.

The vehicle operator or occupant, at step 204, can obtain other information pertinent to the selected location, which other information can include text information or audio information, which audio information is obtained from the audio device (not shown). Other information and reports can include, among other things, information regarding traffic conditions, weather conditions, forecasted traffic conditions, forecasted weather conditions, and any other useful information or news regarding the selected location which may be of interest to the vehicle operator or occupant. Any of the above information, including the video information, can be provided continuously to the vehicle operator or occupant for as long as the vehicle operator or occupant desires to obtain this information from the selected location.

News and/or maintenance services may also provide their respective services and/or information to the vehicle operator or occupant via the web site of the selected location computer 40. In this manner, a news reporting service or maintenance service may provide information, either continuously, and/or at intervals, which is pertinent to the location or which may be of interest to the vehicle operator or occupant.

At step 205, the operator or occupant may select another location to access or decide not to access any further information. At step 206, the vehicle computer 10 will determine if another location was selected by the vehicle operator or occupant. If no other location was selected, the operation of the apparatus 100 will cease at step 207 and the apparatus 100 will await the next activation by the vehicle operator and/or occupant. If, at step 206, it is determined that the vehicle operator or occupant desires to view or obtain information about another location, the operation of the apparatus 100 will return to step 202 and apparatus operation will continue.

As noted above, the information, which is provided by the present invention, can be utilized in assisting a vehicle operator and/or occupant to determine and/or find the most optimal or the least congested route to their destination. For example, a driver headed to a destination may utilize the present invention in order to view the traffic conditions on several alternate roadways or at bridges, tunnels or toll booths along the way. The driver may then utilize the information obtained in order to travel the least congested route.

Figure 5:
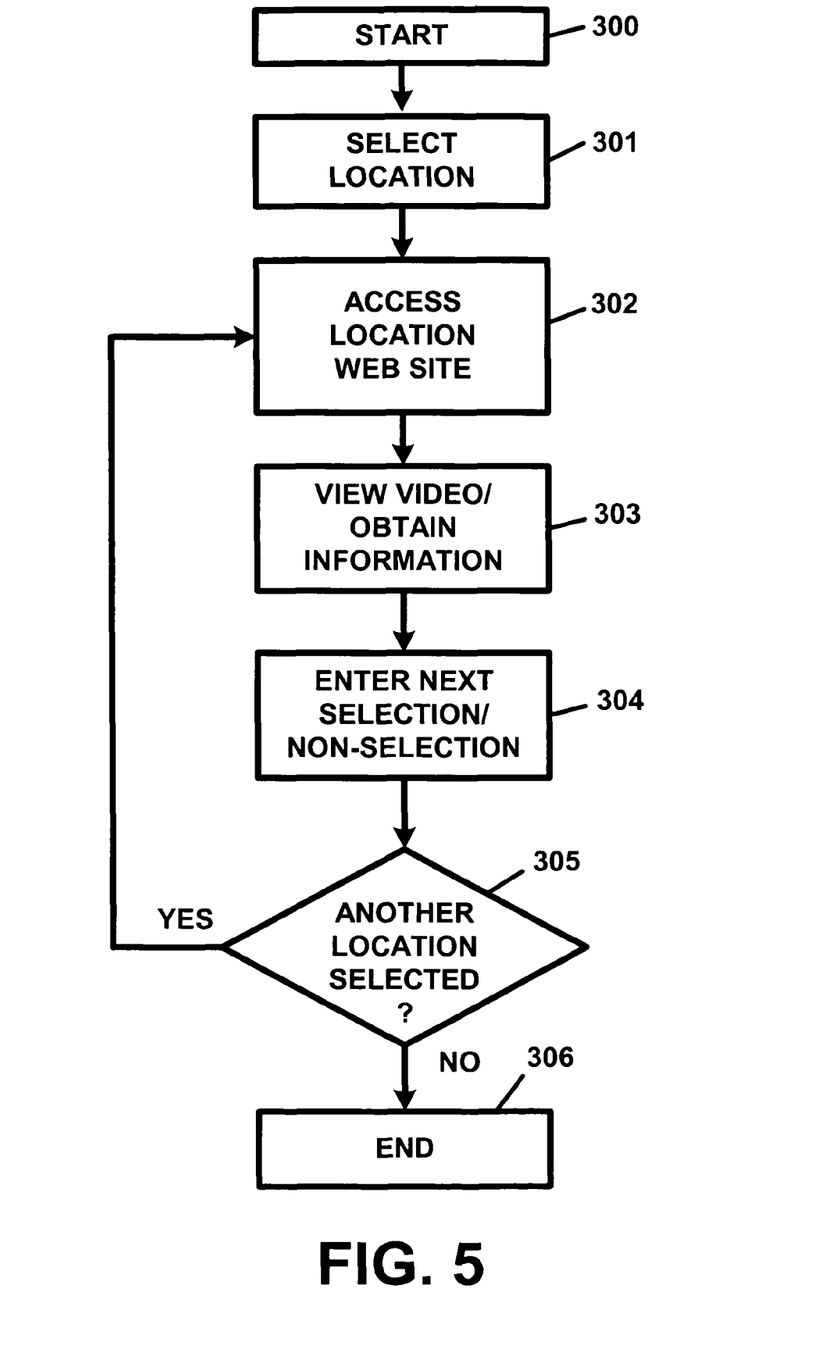
FIG. 5 illustrates a flow chart of an alternate embodiment operation of the apparatus of the present invention.

FIG. 5 illustrates a flow chart of an another preferred embodiment operation of the apparatus 100 of the present invention. With reference to FIG. 5, the operation of the apparatus 100 commences, at step 300, upon activation by the vehicle operator and/or occupant. At step 301, the vehicle operator or occupant selects the location of the selected roadway, highway, expressway, parkway, bridge, tunnel, toll booth, toll booth plaza, parking lot, shopping mall, store, beach, sports facility or arena, or entertainment facility or center (hereinafter referred to as "location"), which the vehicle operator or occupant wants to obtain video and/or other information about. The vehicle operator or occupant selects the location by entering information via the input device 16. At step 301, the operator or occupant will select the location by selecting the URL for the web site of the location computer 40 associated with the selected location.

At step 302, the vehicle computer 10 will access the web site of the location computer 40 for the selected location. At step 303, the vehicle operator or occupant can view the video information pertaining to the selected location via the web site of the selected location computer 40. The video information, as well as other information, is obtained via the display device 17 of the vehicle computer 10. The vehicle operator or occupant, at step 303, can obtain other information pertinent to the selected location, which other information can include text information or audio information, which audio information is obtained from the audio device (not shown).

As with the embodiment of FIG. 4, the other information and reports can include, among other things, information regarding traffic conditions, weather conditions, forecasted traffic conditions, forecasted weather conditions, and any other useful information regarding the selected location which may be of interest to the vehicle operator or occupant. Any of the above information, including the video information, can be provided continuously to the vehicle operator or occupant for as long as the vehicle operator or occupant desires to obtain the information from the selected location.

News and/or maintenance services may also provide information to the vehicle operator or occupant via the web site of the selected location computer 40. In this manner, a news reporting service or maintenance service may provide information, either continuously, and/or at intervals, which is pertinent to the location.

At step 304, the operator or occupant may select another location to access or decide not to access any further information. At step 305, the vehicle computer 10 will determine if another location was selected by the vehicle operator or occupant. If no other location was selected, the operation of the apparatus 100 will cease at step 306 and the apparatus 100 will await the next activation by the vehicle operator and/or occupant. If, at step 305, it is determined that the vehicle operator or occupant desires to view or obtain information about another location, the operation of the apparatus 100 will return to step 302 and apparatus operation will continue.

It is important to note that while the vehicle computer 10 could communicate directly with each of the location computers 40 and/or their web sites, the utilization of the central processing computer(s) 20 and its/their associated web site(s) may be desired as a means by which to provide a link with a number of location computers 40 for purposes of convenience. The utilization of a central processing computer 20 also provides a means by which to access numerous locations in different regions and/or geographic areas.

Figure 6:
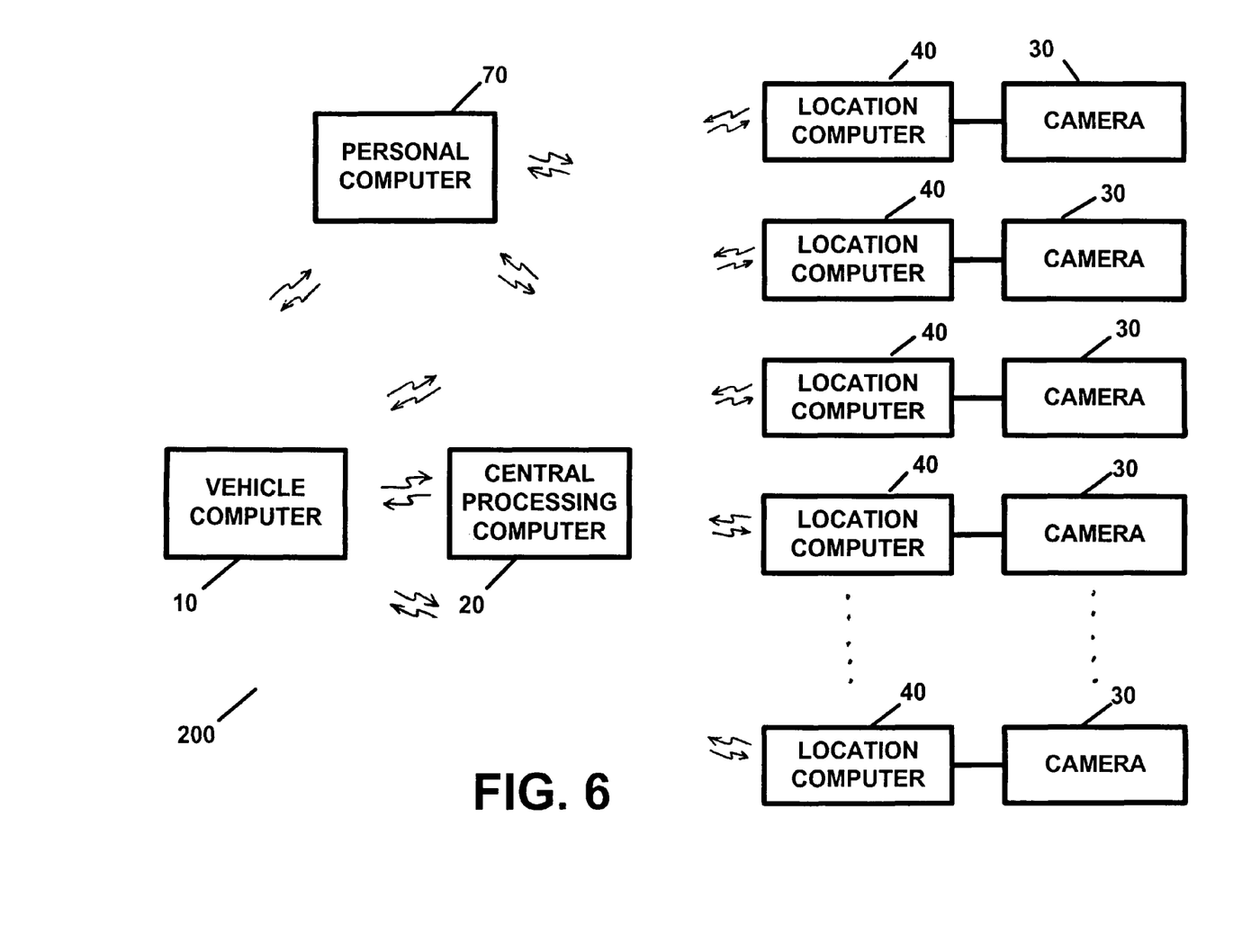
FIG. 6 illustrates another preferred embodiment of the present invention.

In an alternate embodiment, the present invention may be utilized to provide all of the information described herein, regarding the above-described locations, to a user of a home or personal computer including a laptop computer. FIG. 6 illustrates an alternate embodiment of the apparatus of the present invention. In FIG. 6, the apparatus, which is designated by the reference numeral 200, includes a personal computer 70. The user of the personal computer may utilize the apparatus and method of the present invention, in the manner described herein so as to obtain any and all of the herein-described location information via the personal computer 70.

The personal computer 70 can communicate with the vehicle computer 10 so that the personal computer 70 can be utilized to exercise control over the vehicle computer 10 and so as to obtain data and information therefrom. Vehicle position data may be obtained from the global positioning device 50 via the vehicle computer 10 and be utilized by the personal computer 70 so as to determine the location of the vehicle and the location or link information needed to access the central processing computer(s) 20 in the geographic region or area in which the vehicle is located. Location and link information for all of the location computers 40 in the geographic region or area can also be provided to the personal computer 70.

The personal computer 70 can also communicate with any one of the central processing computers 20 and with any one or all of the location computers 40 which are utilized with the apparatus of the present invention.

The personal computer 70 may be any one or more of a home computer, a laptop computer, a handheld computer, a palmtop computer, a television, an interactive television, a digital television, a personal digital assistant, a telephone, a digital telephone, a personal communication device, and a personal communications services device. In this manner, information about any of the herein-described locations can be available to a user at, or from, any location.

In and or all of the embodiments described herein, the vehicle computer 10 may access, and obtain data and/or information directly from the central processing computer(s) 20 which service the region and/or directly from any of the location computers 40. It is also understood that any of the location computers 40 can be accessed via a respective central processing computer(s) 20.

In another preferred embodiment, the vehicle computer 10 includes a microphone (not shown) which, along with associated voice recognition software, allows the vehicle operator or occupant to operate and/or interact with the vehicle computer 10 in a hands-free mode. The vehicle computer 10 can also include a speaker (not shown) for providing audio information regarding vehicle computer operation, information regarding roadways, highways, parkways, expressways, bridges, tunnels, tolls, and/or regarding any other herein-described information which can be of interest to the vehicle operator or occupant. In this manner, the vehicle computer 10 can provide information to the vehicle operator or occupant without requiring the vehicle operator or occupant to have to look at the monitor, video screen, or display device of the vehicle computer 10.

In any of the preferred embodiments described herein, vehicle location data may be entered and/or updated manually by the vehicle operator or occupant such as by selecting location or position information from a menu selection. The selected location will have correlated therewith its latitude and longitude data as well as any other suitable position or location data or information. Vehicle location data can also be entered and/or updated automatically by the global positioning device 50. The entered or updated data may then be processed by the vehicle computer 10 or transmitted to, and processed by, the respective central processing computer(s) 20.

In another preferred embodiment, the apparatus 100 can provide continuous updates of the travel route up ahead. In this embodiment, the vehicle computer 10, having the current vehicle location data or information and destination data or information, can provide automatic sequencing of the video information obtained from the various cameras 30 along the planned travel route. For example, in travel from location A to location Z, the vehicle computer 10, will ascertain, from travel route information stored in the database 60, that locations or points A through Y are located along the planned travel route. The vehicle computer 10 can then sequentially present, to the vehicle operator or occupant, the video information and/or other information obtained by the respective cameras 30 for each of respective locations or points B through Z along the travel route.

The video image presented for each location or point may be timed so as to allow the vehicle operator or occupant adequate time to see it. The vehicle computer can also be programmed to continuously play and replay the travel route video or other information. Video or other information display or presentation time, along with whether continuous replays, can be selected and/or programmed by the vehicle operator or occupant.

The vehicle computer 10 is also programmed to detect change in travel route or a departure from a previous route. If the vehicle computer 10 detects a change in a travel route or a departure from a previous route, the vehicle computer 10 will prompt the vehicle operator or occupant for information as to whether a new destination is intended and re-compute a new travel route from the data or information stored in the database 60.

If the same destination is intended, the vehicle computer 10 will revise the travel route. Change in travel or departure from a previous route may be detected by the manual entry of new location data or new destination data, and/or by the location data obtained from the global positioning device 50. The global positioning device 50, in any of the embodiments described herein, may be operate continuously and/or at any other time or time interval.

In another preferred embodiment, the central processing computer(s) 20 may perform the same functions described above, in the case of the vehicle computer 10, by obtaining vehicle location and destination data from the vehicle computer 10, by processing same in the exact manner described above in the case of the vehicle computer 10, and by transmitting the video and other information for the various locations or points to the vehicle computer 10.

In any of the preferred embodiments described herein, vehicle location data may be entered and/or updated manually by the vehicle operator or occupant such as by selecting location or position information from a menu selection. The selected location will have correlated therewith its latitude and longitude data as well as any other suitable position or location data or information. Vehicle location data can also be entered and/or updated automatically by the global positioning device 50. The entered or updated data may then be processed by the vehicle computer 10 or transmitted to, and processed by, the respective central processing computer(s) 20.

In this embodiment, the central processing computer 20, having the current vehicle location data or information and destination data or information, can provide automatic sequencing of the video information obtained from the various cameras 30 along the planned travel route. For example, in travel from location A to location Z, the central processing computer 20, will ascertain, from travel route information stored in the database 65, that locations or points A through Y are located along the planned travel route. The central processing computer 20 can then sequentially present and transmit to the vehicle computer 10 and the vehicle operator or occupant, the video information and/or other information obtained by the respective cameras 30 for each of respective locations or points along the travel route.

As in the previously described embodiment, the video image presented for each location or point may be timed so as to allow the vehicle operator or occupant adequate time to see it. The central processing computer can also be programmed to continuously play and replay the travel route video or other information. Video or other information display or presentation time, along with whether continuous replays, can be selected and/or programmed by the vehicle operator or occupant via the vehicle computer 10.

The central processing computer 20 is also programmed to detect change in travel route or a departure from a previous route. If the central processing computer 20 detects a change in a travel route or a departure from a previous route, the central processing computer 20 will prompt the vehicle operator or occupant for information as to whether a new destination is intended and re-compute a new travel route from the data or information stored in the database 65.

If the same destination is intended, the central processing computer 20 will revise the travel route. Change in travel or departure from a previous route may be detected by the manual entry of new location data or new destination data, and/or by the location data obtained from the global positioning device 50 or the vehicle computer 10. The global positioning device 50, in any of the embodiments described herein, may be operate continuously and/or at any other time or time interval.

In this manner, the apparatus and method of the present invention can provide video and other information about a travel route or location or point along, or on, a travel route, in real-time.

In another preferred embodiment, an individual can preview the travel route for an anticipated or planned travel route via the personal computer 70, such as from home or from the office or from any other place. The individual may also preview the travel route via the vehicle computer 10 prior to embarking on his journey or before leaving his driveway.

The present invention provides real-time traffic conditions, road conditions and weather conditions and provides valuable information to any traveler.

The present invention may be utilized, in all of the herein-described embodiments, in conjunction with vehicles of any type, including automobiles, recreational vehicles, motorcycles, motor homes, mobile homes, commercial vehicles, commercial equipment, marine vehicles, marine vessels, boats, aircraft, airplanes, jets, helicopters and any other vehicle of piece of equipment. In this manner, an operator or occupant of the vehicle or piece of equipment may benefit from the utilization of the apparatus and method of the present invention.

The present invention describes an apparatus and a method for providing the above-described information about the above-described locations so as the provide a vehicle operator and/or occupant with valuable information concerning the roadways, bridges, tunnels, toll booths and/or parking lots, as well as other locations, which would enable the vehicle operator and/or occupant to make informed driving and/or traveling decisions. For example, a vehicle operator traveling to a given destination, may wish to view various locations along the way to minimize driving and/or traveling time and/or effort.

By utilizing the apparatus and method of the present invention, the vehicle operator may view roadways, bridges, tunnels, toll booths, and other entities along the way, so as to select the route with the least traffic, congestion or delays. Further, the apparatus and method of the present invention provides an embodiment for allowing a user of a home or personal computer to obtain the same information from his or her home or other location, so as to more carefully plan out his or her trip beforehand. As noted above, the present invention can be utilized to provide information and coverage internationally.

While the present invention has been described and illustrated in various embodiments, such description and illustrations are merely illustrative of the present invention and are not to be construed to be limitations thereof. Accordingly, the present invention encompasses any and all modifications, variations, and/or alternate embodiments, with the scope of the present invention being limited only by the claims which follow.

What is claimed is:

1. An apparatus, comprising:
    a global positioning device, wherein the global positioning device determines a location of the apparatus or a location of a vehicle;
    a processing device, wherein the processing device processes information regarding the location of the apparatus or the location of the vehicle and information regarding a destination, wherein the processing device determines or identifies a travel route to the destination on or along a road, a roadway, a highway, a parkway, or an expressway;
    a display device or a speaker, wherein the display device displays information regarding the travel route or the speaker provides audio information regarding the travel route;
    and
    a receiver, wherein the receiver receives traffic information or information regarding a traffic condition,
    wherein the apparatus provides the traffic information or the information regarding a traffic condition via the display device or via the speaker.

2. The apparatus of claim 1, wherein the apparatus detects a departure from the travel route, and further wherein the apparatus determines or identifies a second travel route to the destination, and further wherein the apparatus provides information regarding the second travel route.

3. The apparatus of claim 1, wherein the apparatus receives video information regarding the travel route or video information regarding a second travel route to the destination, and further wherein the apparatus provides the video information regarding the travel route or the video information regarding the second travel route.

4. The apparatus of claim 1, wherein the video information regarding the travel route or the video information regarding a second travel route is obtained with or by at least one camera located along, on, adjacent to, or near, the travel route or the second travel route via the display device.

5. The apparatus of claim 1, wherein the apparatus provides a video preview of the travel route or a picture or image along the travel route or provides a video preview of a second travel route to the destination or a picture or image along the second travel route.

6. The apparatus of claim 1, wherein the apparatus receives information regarding a traffic forecast associated with the travel route or a traffic forecast associated with a second travel route to the destination, and further wherein the apparatus provides the information regarding the traffic forecast associated with the travel route or the traffic forecast associated with the second travel route via the display device or the speaker.

7. The apparatus of claim 1, wherein the apparatus receives maintenance information associated with the travel route or maintenance information associated with a second travel route to the destination, and further wherein the apparatus provides the maintenance information associated with the travel route or the maintenance information associated with the second travel route via the display device or the speaker.

8. The apparatus of claim 1, wherein the apparatus receives information regarding a weather condition, weather information, a forecasted weather condition, or a weather forecast, and further wherein the apparatus provides the information regarding the weather condition, the weather information, the forecasted weather condition, or the weather forecast via the display device or the speaker.

9. The apparatus of claim 1, wherein the apparatus receives information regarding a news report, and further wherein the apparatus provides the information regarding the news report via the display device or the speaker.

10. The apparatus of claim 1, wherein the display device is located or mounted on, or adjacent to, a dashboard of the vehicle or a console of the vehicle.

11. The apparatus of claim 1, wherein the apparatus receives travel route information transmitted from a computer, a transmitter, or a device, located remote from the apparatus, and further wherein the apparatus provides the travel route information via the display device or the speaker, or wherein the apparatus receives information regarding a traffic condition, and further wherein the apparatus provides the information regarding a traffic condition via the display device or the speaker.

12. The apparatus of claim 1, further comprising:
    a microphone and voice recognition software, wherein the microphone and the voice recognition software provides or facilitates a hands-free mode of apparatus operation.

13. The apparatus of claim 1, wherein the apparatus processes a request to provide video information from or associated with a selected location, wherein the selected location is located remote from the apparatus, wherein the apparatus receives the video information from a computer or communication device associated with the selected location, and further wherein the apparatus provides the video information via the display device.

14. The apparatus of claim 1, wherein the apparatus automatically detects a departure from the travel route, and further wherein the apparatus identifies a second travel route to the destination in response to the detected departure from the first travel route, wherein the apparatus provides information regarding the second travel route.

15. An apparatus, comprising:
a camera for obtaining a photograph, a picture, or an image, of a road, a roadway, a highway, a parkway, or an expressway, or for obtaining a photograph, a picture, or an image, of traffic on a road, a roadway, a highway, a parkway, or an expressway;
a global positioning device for determining a position or a location of the apparatus or a position or a location of a vehicle;
a processing device for processing information regarding the position or the location of the apparatus or the position or the location of the vehicle and information regarding a destination, wherein the processing device determines or identifies a travel route to the destination on a road, a roadway, a highway, a parkway, or an expressway;
a display device for displaying information regarding the travel route, or a speaker for providing audio information regarding the travel route; and
a receiver, wherein the receiver receives traffic information, weather information, or news information, or information regarding a traffic condition or a weather condition,
wherein the apparatus provides the traffic information, the weather information, or the news information, or the information regarding a traffic condition or a weather condition, via the display device or via the speaker.

16. The apparatus of claim 15, wherein the display device is located or mounted on, or adjacent to, a dashboard of the vehicle or a console of the vehicle.

17. The apparatus of claim 15, further comprising:
a microphone and voice recognition software, wherein the microphone and the voice recognition software provides or facilitates a hands-free mode of apparatus operation.

18. The apparatus of claim 15 , wherein the apparatus processes a request to provide video information from or associated with a selected location, wherein the apparatus receives the video information from a computer or communication device associated with the selected location, and further wherein the apparatus provides the video information via the display device.

19. The apparatus of claim 15, wherein the apparatus automatically detects a departure from the travel route, and further wherein the apparatus identifies a second travel route to the destination in response to the detected departure from the travel route, wherein the apparatus provides information regarding the second travel route.

20. The apparatus of claim 15, wherein the display device displays a plurality of video images simultaneously.

21. An apparatus, comprising:
a camera for obtaining a photograph, a picture, or an image, of or in the vicinity of a road, a roadway, a highway, a parkway, or an expressway, or for obtaining a photograph, a picture, or an image, of traffic on a road, a roadway, a highway, a parkway, or an expressway;
a global positioning device for determining a position or a location of the apparatus or a position or a location of a vehicle;
a processing device for processing information regarding the position or the location of the apparatus or the position or the location of the vehicle and information regarding a destination, wherein the processing device determines or identifies a travel route to the destination on a road, a roadway, a highway, a parkway, or an expressway;
a display device for displaying information regarding the travel route, or a speaker for providing audio information regarding the travel route; and
wherein the apparatus processes a request to provide video information obtained at a selected location, wherein the apparatus receives the video information from a computer or communication device associated with the selected location, and further wherein the apparatus provides the video information via the display device or transmits the video information to a communication device or a computer.

22. The apparatus of claim 21 , further comprising:
a microphone and voice recognition software, wherein the microphone and the voice recognition software provides or facilitates a hands-free mode of apparatus operation.

23. The apparatus of claim 21, wherein the apparatus automatically detects a departure from the travel route, and further wherein the apparatus identifies a second travel route to the destination in response to the detected departure from the travel route, wherein the apparatus provides information regarding the second travel route.

24. The apparatus of claim 21, wherein the display device displays a plurality of video images simultaneously.

25. The apparatus of claim 21, further comprising:
a receiver, wherein the receiver receives traffic information, weather information, or news information, or information regarding a traffic condition or a weather condition,
wherein the apparatus provides the traffic information, the weather information, or the news information, or the information regarding a traffic condition or a weather condition, via the display device or via the speaker.

* * * * *

(12) INTER PARTES REVIEW CERTIFICATE (2669th)
United States Patent (10) Number: US 9,885,782 K1
Joao (45) Certificate Issued: Mar. 11, 2022

(54) VEHICLE OPERATOR AND/OR OCCUPANT INFORMATION APPARATUS AND METHOD

(75) Inventor: Raymond Anthony Joao

(73) Assignee: NAVBLAZER, LLC

Trial Numbers:

IPR2020-00983 filed May 29, 2020
IPR2021-00504 filed Feb. 5, 2021

Inter Partes Review Certificate for:

Patent No.: 9,885,782
Issued: Feb. 6, 2018
Appl. No.: 13/374,915
Filed: Jan. 23, 2012

The results of IPR2020-00983 and IPR2021-00504 are reflected in this inter partes review certificate under 35 U.S.C. 318(b).

INTER PARTES REVIEW CERTIFICATE
U.S. Patent 9,885,782 K1
Trial No. IPR2020-00983
Certificate Issued Mar. 11, 2022

AS A RESULT OF THE INTER PARTES REVIEW PROCEEDING, IT HAS BEEN DETERMINED THAT:

Claims 1-19, 21-23 and 25 are cancelled.

\* \* \* \* \*